United States Patent Office 2,834,786
Patented May 13, 1958

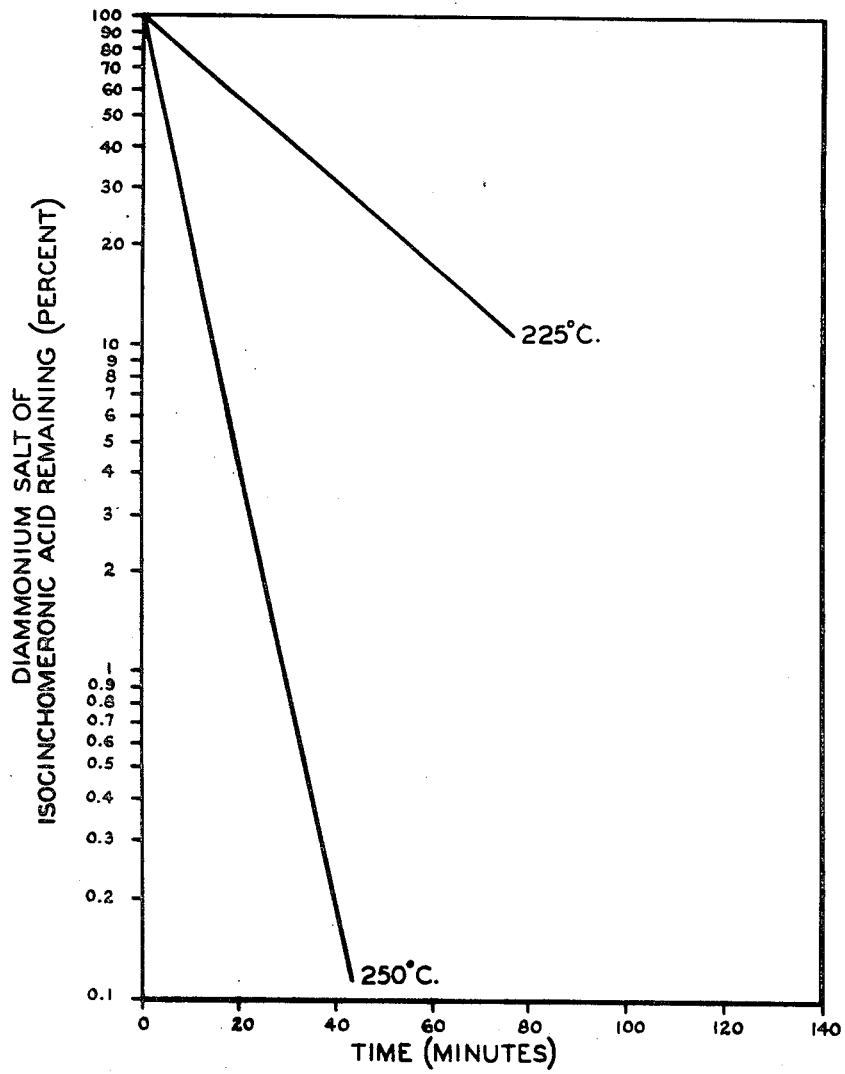

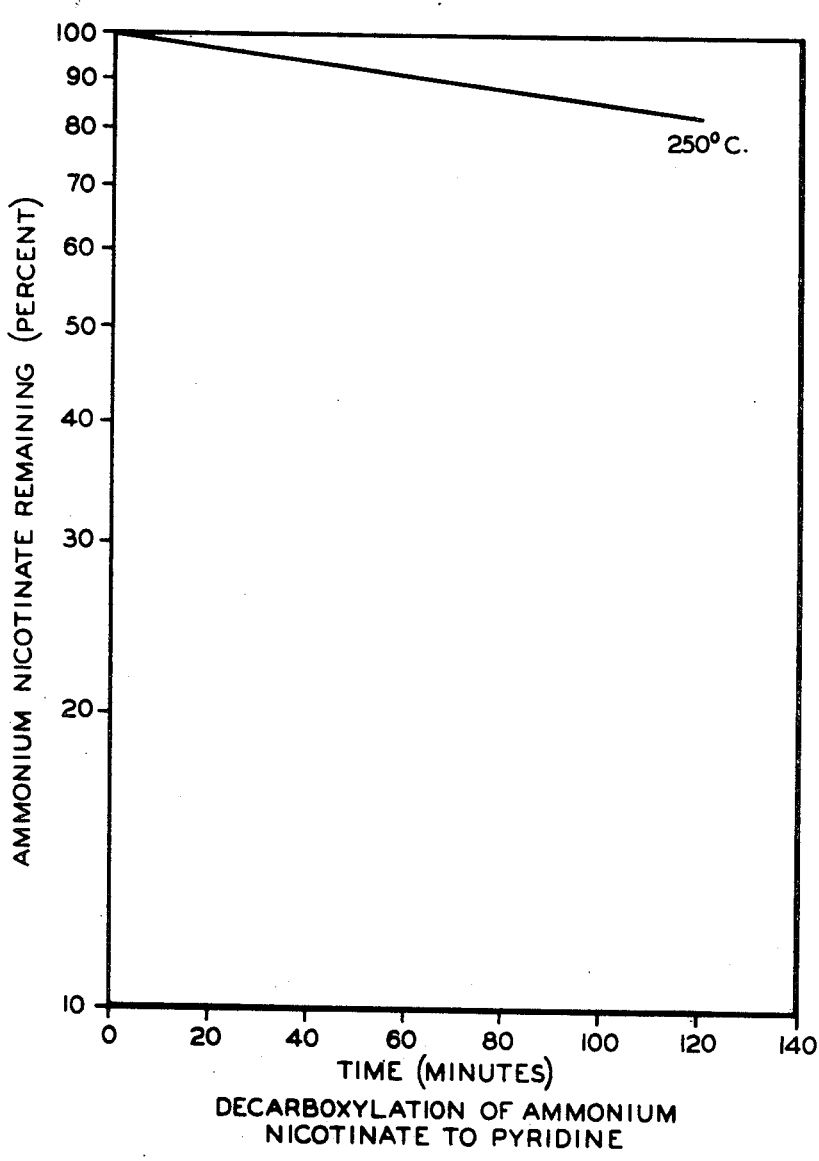

2,834,786

PROCESS FOR PREPARING NICOTINIC ACID

Max B. Mueller, Westwood, N. J., assignor to Allied Chemical & Dye Corporation, New York, N. Y., a corporation of New York Application September 1, 1955, Serial No. 531,931

7 Claims. (Cl. 260—295.5)

This invention relates to a process for preparing nicotinic acid from isocinchomeronic acid.

Nicotinic acid, i. e. 3-pyridinecarboxylic acid, is a member of the vitamin B group, (niacin), and is useful as a therapeutic agent, and as an additive to foods, such as wheat flour, etc., and to animal feedstuffs.

Nicotinic acid may be prepared by a number of processes, including the oxidation of beta substituted pyridines such as 3-picoline, quinoline, etc. Oxidation of certain α,β-substituted pyridines such as 2-methyl-5-ethyl pyridine produces isocinchomeronic acid, i. e. 2,5-pyridinedicarboxylic acid.

2-methyl-5-ethylpyridine, sometimes referred to as "aldehyde collidine" or as "aldehydine," or as 3-ethyl-6-methyl pyridine, may be readily prepared synthetically by the reaction of paraldehyde, ammonia and ammonium acetate, and is thus available in large quantities. Its oxidation to 2,5-pyridinedicarboxylic acid can be readily effected by treatment with nitric acid solution, at relatively low temperatures, i. e. in the vicinity of 160° C. to 200° C., and by oxidation with sulfuric acid in the presence of a catalyst.

It is known that decarboxylation of the alpha (i. e. 2 or 6) acid group of the 2,5-pyridinedicarboxylic acid may be effected, with the production of nicotinic acid, in the same reaction medium in which the oxidation of the 2-methyl-5-ethyl pyridine is carried out, by continuing the oxidation process under more drastic conditions than were necessary to produce the dicarboxylic acid, particularly at increased temperatures and at superatmospheric pressures. Use of such high temperatures coupled with pressure in the presence of strong oxidizing agents, tends, however, to result in cleavage of both carboxylic acid groups unless conditions are controlled with the utmost care, resulting in considerable decomposition to pyridine, thus reducing the yield of the desired nicotinic acid.

Accordingly, since it is well known that 2,5-pyridinedicarboxylic acid may be converted to nicotinic acid simply by heating it in a sealed tube at temperatures around 250° C., it has been found expedient in the past to produce and isolate the dicarboxylic acid first, and, when nicotinic acid is desired, obtain it by decarboxylation of the alpha group under milder conditions than those obtaining in the original oxidation medium. This procedure is favored for the further reason that 2,5-pyridinedicarboxylic acid is useful not only as an intermediate in the preparation of nicotinic acid, but also in the dyestuffs industry. Thus 2,5-pyridinedicarboxylic acid is widely produced and is available as an article of commerce.

As brought out above, conversion of 2,5-pyridinedicarboxylic acid (isocinchomeronic acid) to 3-pyridinecarboxylic acid (nicotinic acid) may be effected by heat alone. Decarboxylation proceeds according to the following equation:

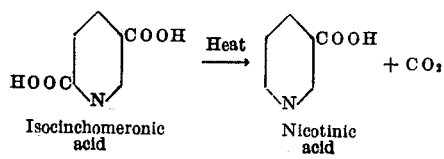

While the above procedure is satisfactory for conversions on a small scale, carried out according to batchwise methods, simple heating of the solid isocinchomeronic acid is unsatisfactory as a commercial conversion method as it is unadapted for continuous operation, and also because the resulting nicotinic acid sublimes from the mixture and thus presents the difficulty of recovering a vaporous product with its attendant precautions and losses.

Nitric acid decarboxylation is unsatisfactory because the nicotinic acid product as formed is rapidly decomposed to pyridine and the pyridine itself further oxidized.

While the sulfuric acid decarboxylation proceeds smoothly, it is unsatisfactory because it involves costly recovery steps for separating the nicotinic acid from the sulfuric.

It is an object of my invention to provide a novel process for preparing nicotinic acid from isocinchomeronic acid, which is adapted for continuous as well as batch operation.

A further object is to provide such a process wherein high yields of nicotinic acid are obtained.

A still further object is to provide a process for preparing nicotinic acid from isocinchomeronic acid by decarboxylation of the alpha carboxyl group in which a minimum of decomposition of the resulting nicotinic acid takes place.

A still further object of the invention is to provide a process for obtaining nicotinic acid of high purity from isocinchomeronic acid without costly recovery steps.

These and other objects are accomplished according to my invention wherein an aqueous solution of diammonium isocinchomeronate is subjected to temperatures between about 225° C. and about 325° C. in a confined space at pressures between about 500 and about 1500 p. s. i. g. for a period of time sufficient to convert substantially all of the diammonium isocinchomeronate to ammonium nicotinate with little or virtually no decomposition of the ammonium nicotinate so formed.

In carrying out the process according to my invention, isocinchomeronic acid is converted into its diammonium salt as by dissolving it in a solution of ammonium hydroxide of sufficient concentration to replace the hydrogens of both carboxylic acid groups, and to provide an aqueous solution of diammonium isocinchomeronate of the desired concentration. The solution is then subjected to elevated temperature and superatmospheric pressure for the time necessary to effect the desired conversion to ammonium nicotinate.

In batchwise operation, the diammonium isocinchomeronate solution may simply be heated in a sealed vessel under autogenous pressure to the reaction temperature, in this case preferably about 300° C. at which an autogenous pressure of about 1300 p. s. i. g. develops. Under such conditions a high yield (about 90%), of ammonium nicotinate is obtained in not more than about 5 minutes. At lower temperatures somewhat longer times are required. In continuous operation the aqueous diammonium isocinchomeronate is passed through a continuous reactor, suitably a coil reactor, at such a rate as to provide a residence time of between about 2 minutes and about 2 hours at the reaction temperature which may be between about 225° C. and about 325° C. The ammonium nicotinate product is continuously withdrawn and may be converted to nicotinic acid by adjustment of the pH to between about 3.4 and about 3.6, preferably to as near to 3.5 as feasible, for example with a mineral acid such as sulfuric or hydrochloric acid, and cooling, for example to between about 25° C. and about 0° C. to precipitate nicotinic acid, and thereafter separating solid insoluble nicotinic acid from the mother liquor leaving the ammonium salt of the mineral acid in solution.

The time required will depend on the temperature used, higher temperatures promoting more rapid reaction and thus requiring shorter times, and to some extent on the concentration of the solution. The time at reaction temperature should not be prolonged unduly, particularly at higher temperatures as progressively greater breakdown of the ammonium nicotinate to pyridine occurs at higher temperatures. Thus, the temperature used should be high enough to produce decarboxylation of the alpha carboxylic acid group in a reasonably short time, but low enough not to promote an accelerated decomposition of the ammonium nicotinate to pyridine by destruction of the beta carboxylic acid group also. Temperatures between about 225° C. and about 325° C. meet the above requirements and are satisfactory for use in my process. In a batch process, agitation is desirable to secure uniformity of time-temperature conditions. In a continuous process such uniformity may be obtained by providing a sufficient velocity to maintain turbulent flow.

Pressures at which the process is carried out may be the autogenous pressures developed at the temperatures employed, due to the liberation of carbon dioxide and steam or may be the result of pressuring the system, and may range from about 500 p. s. i. g. to about 1500 p. s. i g.

The concentration of diammonium isocinchomeronate used in the reaction is not unduly critical. Any desired concentration may be used up to the point of saturation of the diammonium isocinchomeronate in water (about 33% by weight). While lower concentrations result in somewhat more rapid conversions than higher concentrations, nevertheless, extremely low concentrations have the disadvantage of reducing the proportion of the nicotinic acid that may be recovered by direct crystallization from the solution since a great amount remains in solution in the excess of water, and must be recovered by more complicated procedures. High concentrations have the advantage of providing smaller volumes to be handled. However, concentrations approaching the saturation point are disadvantageous in tending to precipitate solid diammonium isocinchomeronate. Accordingly, I prefer to employ aqueous solutions having concentrations of diammonium isocinchomeronate of between about 12% and about 30% by weight.

The process of my invention is made possible by my discovery that the rate of decarboxylation of isocinchomeronic acid diammonium salt to nicotinic acid ammonium salt is significantly more rapid than the decarboxylation of nicotinic acid ammonium salt to pyridine at the temperatures employed in my process. This difference is clearly brought out in the drawings wherein Figure 1 illustrates the rate of decarboxylation to ammonium nicotinate of diammonium isocinchomeronate in 17.5% solution, at 225° and at 250° C.; Figure 2 illustrates the rate of decarboxylation of ammonium nicotinate to pyridine at 250° C.

Figure 1 shows the amount, in terms of percent of diammonium isocinchomeronate, remaining after heating in aqueous solution for the indicated number of minutes at temperatures of 250° C. and 225° C. It will be noted that decarboxylation proceeds more slowly at 225° C. than at 250° C., but, comparing with Figure 2, it will be noted that these rates are significantly faster than the decarboxylation of ammonium nicotinate to pyridine at 250° C. Thus, the differences in rates of decarboxylation, at the temperatures employed, of the alpha carboxylic acid radical (which splits off more readily) and the beta radical are so great as to permit substantially complete decarboxylation of the alpha before significant decomposition of the beta takes place, and to permit high yields (90–95%) of nicotinic acid to be recovered.

An important advantage of this process is that no complicated recovery steps are necessary to obtain a major proportion, i. e. up to 90% or more of the nicotinic acid produced, directly in the form of a high purity (99%+) nicotinic acid, suitable to meet the U. S. P. requirements, by adjustment of pH to the isoelectric point of nicotinic acid (3.5), cooling, and recovering as by filtration. The small proportion of the nicotinic acid remaining in solution in the mother liquor is not lost, and may be recovered by conventional means, as by concentration and further crystallization, or by precipitation and recovery as the copper salt, etc.

The following specific examples further illustrate my invention. Parts are by weight except as otherwise noted.

EXAMPLE 1

An aqueous solution containing 17.5% of ammonium isocinchomeronate is prepared by forming a saturated solution of about 29% isocinchomeronic acid in 28% ammonium hydroxide solution and diluting with an equal weight of water. Five part portions of the resulting solution, amounting to 0.875 part by weight of ammonium isocinchomeronate in each portion, are placed in ⅜ inch steel tubes closed at one end. The tubes are welded shut and then immersed in an oil bath maintained at 300° C. Individual tubes are removed after different intervals, the contents removed into volumetric flasks, adjusted to pH 3.5 (the isoelectric point of nicotinic acid), and analysed spectrophotometrically for mol percentages of nicotinic acid, isocinchomeronic acid and pyridine with the results shown in Table 1 below. It will be noted that prolonged heating decomposes increasing amounts of the ammonium nicotinate to pyridine.

Table 1

| Time in Minutes | Mol Percent Nicotinic Acid | Mol Percent Isocinchomeronic Acid | Mol Percent Pyridine |
| --- | --- | --- | --- |
| 5 | 89.5 | 1.7 | 5.9 |
| 10 | 80.9 | | 13.3 |
| 20 | 75.5 | | 19.4 |
| 40 | 48.3 | | 53.5 |
| 80 | 27.8 | | 71.5 |

Nicotinic acid is recovered by cooling the adjusted solution and mechanically separating precipitated nicotinic acid.

EXAMPLE 2

A 17.5% aqueous solution of diammonium isocinchomeronate is prepared by dissolving 145 parts of isocinchomeronic acid in 218 parts of a 28% ammonium hydroxide solution and adding water to bring the solution to 1,000 parts by weight. 790 parts of the resulting diammonium isocinchomeronate solution is fed continuously through a continuous flow reactor comprising a reactor coil immersed in a constant temperature bath, and a cooling coil, the system being equipped with feed pump and pressure regulator. The reactor coil is maintained at a temperature of 250° C. ±1° C., and under a pressure of 800–900 p. s. i. g. Upon entering the reactor coil, the solution is brought almost instantaneously to reaction temperature, i. e. in a matter of seconds. Average time at reaction temperature is about 20 minutes. The resulting product-containing solution amounts to 779 parts. Of this product, 774 parts are treated with 5 parts of active carbon and filtered. The pH of the filtrate is adjusted to 3.5 with 135 parts of concentrated (37%) HCl, cooled to 0° C., thus precipitating nicotinic acid, and the mixture is filtered. The nicotinic acid filter cake, after washing with 50 parts of water and drying, amounts to 101 parts assaying at least 99.5% pure nicotinic acid by spectrophotometric analysis. The filtrate from which the bulk of the nicotinic acid has been recovered as described above, amounts to 894 parts and contains .56% nicotinic acid and 0.0325% isocinchomeronic acid by spectrophotometric analysis. Yield of high purity nicotinic acid, based on charged isocinchomeronic acid is 95.2%. The nicotinic acid remaining in the mother liquor may be recovered by conventional means, for example, by precipitation as the copper salt. Total yield based on the isocinchomeronic acid reacted is 99.5%.

While the above describes the preferred embodiments of my invention, it will be understood that departures may be made therefrom within the scope of the specification and claims.

I claim:

1. A process for converting the diammonium salt of isocinchomeronic acid to ammonium nicotinate, which comprises subjecting a non-acidic aqueous solution of said diammonium salt of isocinchomeronic acid to temperatures between about 225° C. and about 325° C. under pressures ranging from about 500 p. s. i. g. to about 1500 p. s. i. g. for a time between about 2 minutes and about 2 hours, correlated with temperature, whereby substantial decarboxylation of the alpha carboxylate group is effected without substantial decarboxylation of the beta carboxylate group.

2. The process according to claim 1 wherein the aqueous solution of diammonium isocinchomeronate has a concentration between about 12% and about 30%.

3. A process for converting isocinchomeronic acid to nicotinic acid which comprises dissolving isocinchomeronic acid in an aqueous solution of ammonium hydroxide containing at least 2 moles of ammonium hydroxide per mole of isocinchomeronic acid used, whereby the isocinchomeronic acid is substantially completely converted to diammonium isocinchomeronate, subjecting the solution thus prepared to temperatures between about 225° C. and about 325° C. in a confined space under pressure ranging from about 500 p. s. i. g. to about 1500 p. s. i. g. for a time between about 2 minutes and about 2 hours, correlated with temperature, whereby substantial decarboxylation of the alpha ammonium carboxylate group is effected without substantial decarboxylation of the beta ammonium carboxylate group, adjusting the pH of the resulting solution to between about 3.4 and about 3.6, cooling, whereby nicotinic acid of at least about 99% purity is precipitated, and recovering the precipitated nicotinic acid.

4. A process for producing nicotinic acid which comprises subjecting an aqueous solution of diammonium isocinchomeronate of a concentration in the range between about 12% and about 30% by weight, to a temperature between about 225° C. and about 325° C. in a confined space under pressure from about 500 p. s. i. g. to about 1500 p. s. i. g. for a time between about 2 minutes and about 2 hours, correlated with temperature, whereby substantial decarboxylation of the alpha ammonium carboxylate group is effected without substantial decarboxylation of the beta ammonium carboxylate group, adjusting the pH of the resulting solution to between about 3.4 and about 3.6, cooling, whereby nicotinic acid of at least about 99% purity is precipitated, and recovering the precipitated nicotinic acid.

5. A continuous process for the preparation of ammonium nicotinate which comprises continuously passing an aqueous solution of diammonium isocinchomeronate through a confined reaction zone maintained at a temperature in the range between about 225° C. and about 325° C. and under pressure ranging from about 500 p. s. i. g. to about 1500 p. s. i. g. during a residence time correlated with temperature of between about 2 minutes and about 2 hours, whereby diammonium isocinchomeronate is converted to ammonium nicotinate.

6. The process according to claim 5 wherein the solution of diammonium isocinchomeronate has a concentration between about 12% and about 30%.

7. In the conversion of isocinchomeronic to nicotinic acid values, the step which comprises continuously passing a concentrated aqueous solution of diammonium isocinchomeronate through a decarboxylation zone at between about 225° C. and about 325° C. and between about 500 p. s. i. g. and about 1500 p. s. i. g. at a rate to provide a residence time between about 2 minutes and about 2 hours correlated with temperature, whereby between 80% and 99% of the alpha carboxylate group of the isocinchomeronate introduced is decarboxylated, without substantial decarboxylation of the beta carboxylate group.

References Cited in the file of this patent

UNITED STATES PATENTS

| | | |
|---|---|---|
| 1,551,373 | Daudt | Aug. 25, 1925 |
| 1,955,050 | Brode | Apr. 17, 1934 |
| 2,389,065 | Lee | Nov. 13, 1945 |
| 2,702,802 | Aries | Feb. 22, 1955 |
| 2,708,196 | Aries | May 10, 1955 |

FOREIGN PATENTS

| | | |
|---|---|---|
| 851,801 | Germany | Aug. 7, 1952 |

OTHER REFERENCES

Beilstein: Handbuch der Org. Chemie, Band 22, Vierte Auflage, p. 38.

Holleman: "Org. Chem.," p. 555 (1951), Elsevier Pub. Co., New York.